(12) United States Patent
Li et al.

(10) Patent No.: US 11,295,082 B2
(45) Date of Patent: Apr. 5, 2022

(54) CONVERTING TEXT-BASED REQUIREMENTS TO A LIVE PROTOTYPE

(71) Applicant: Schlumberger Technology Corporation, Sugar Land, TX (US)

(72) Inventors: Zhen Li, Menlo Park, CA (US); Zhenghao Ju, San Jose, CA (US); Monisha Manoharan, Menlo Park, CA (US); Adelle Knight, Menlo Park, CA (US); Jiajing Guo, Menlo Park, CA (US)

(73) Assignee: Schlumberger Technology Corporation, Sugar Land, TX (US)

(*) Notice: Subject to any disclaimer, the term of this patent is extended or adjusted under 35 U.S.C. 154(b) by 217 days.

(21) Appl. No.: 16/803,910

(22) Filed: Feb. 27, 2020

(65) Prior Publication Data

US 2021/0271815 A1    Sep. 2, 2021

(51) Int. Cl.
*G06F 40/289* (2020.01)
*G10L 15/26* (2006.01)
*G06F 40/284* (2020.01)

(52) U.S. Cl.
CPC .......... *G06F 40/289* (2020.01); *G06F 40/284* (2020.01); *G10L 15/26* (2013.01)

(58) Field of Classification Search
CPC ........ G06F 40/289; G06F 40/284; G06F 8/30; G10L 15/26
USPC .......................................................... 704/9
See application file for complete search history.

(56) References Cited

PUBLICATIONS

R. E. Kurt Stirewalt, et al., "Automating UI Generation by Model Composition", Proceedings 13th IEEE International Conference on Automated Software Engineering, 1998 10 pages.
Yang, Q., et al., "Sketching NLP: A Case Study of Exploring the Right THings to Design with Language Intelligence", CHI 2019, May 4-9, 2019, 12 pages.
Yang, Q., et al., "Investigating How Experienced UX Designers Effectively Work with Machine Learning", DIS'18 Proceedings of the 2018 Designed Interactive Systems Conference, Jun. 2018, 13 pages.
SpaCy, "Annotation Specifications", https://spacy.io/api/annotation, 2016, 17 pages.
"DisplaCY Dependency Visualizer", https://explosion.ai/demos/displacy, 3 pages.

*Primary Examiner* — Thierry L Pham
(74) *Attorney, Agent, or Firm* — Michael Guthrie

(57) ABSTRACT

Converting text-based requirements to a live prototype includes receiving text with a natural language string. The text includes a term for a component from a design language system and the natural language string describes at least a part of an interface. The method further includes generating, by a converter module, an output string from the text by: tokenizing the text to form a plurality of tokens that include a token for the term, tagging the token with a tag for the term, and applying a rule that uses the token and the tag. Applying the rule maps the token to the component of the design language system and writes the component into the output string. The method further includes generating the interface from the output string. The interface is made with the design language system and includes the component from the output string. The interface is presented with the component to a device.

20 Claims, 10 Drawing Sheets

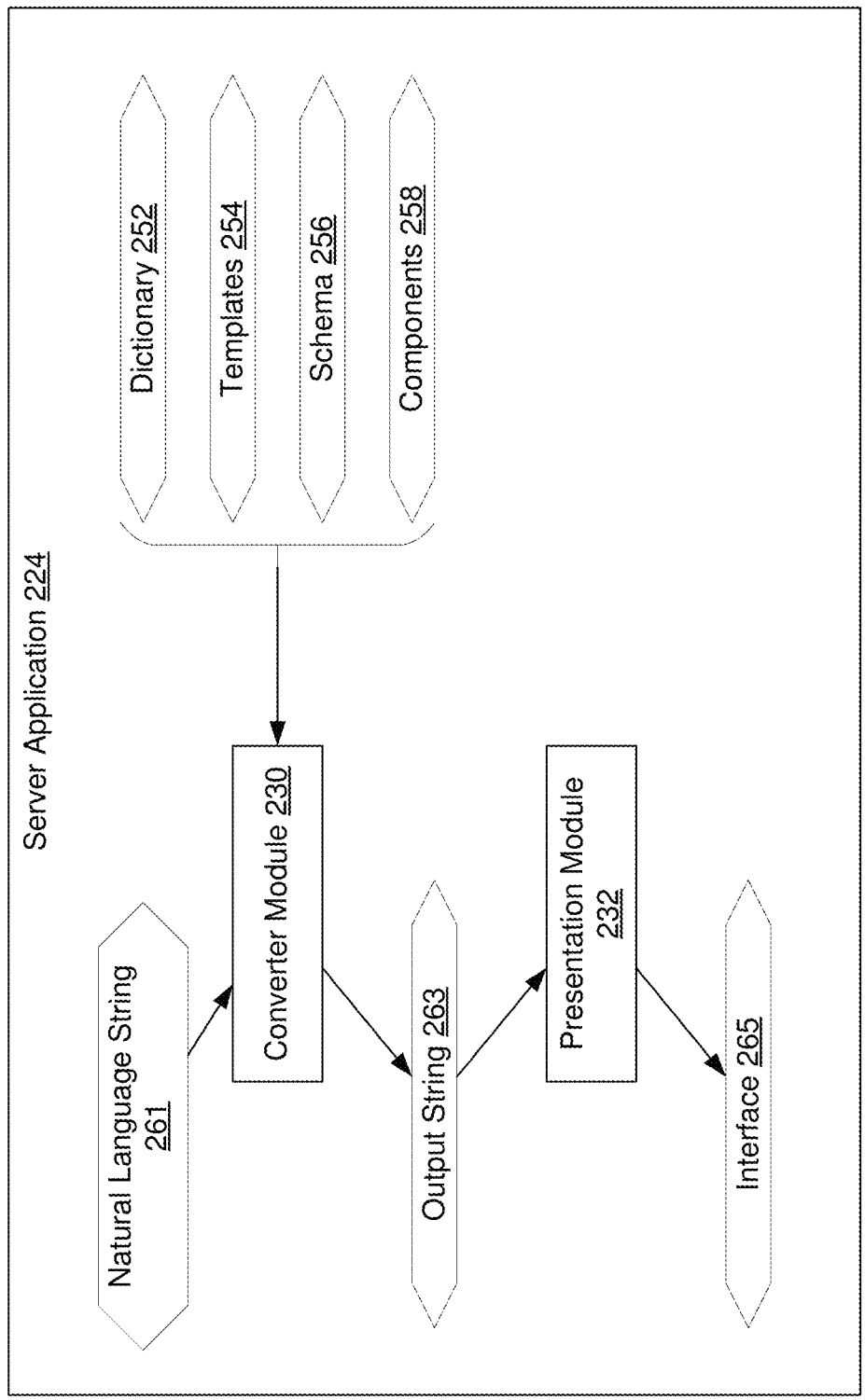
FIG. 2.1

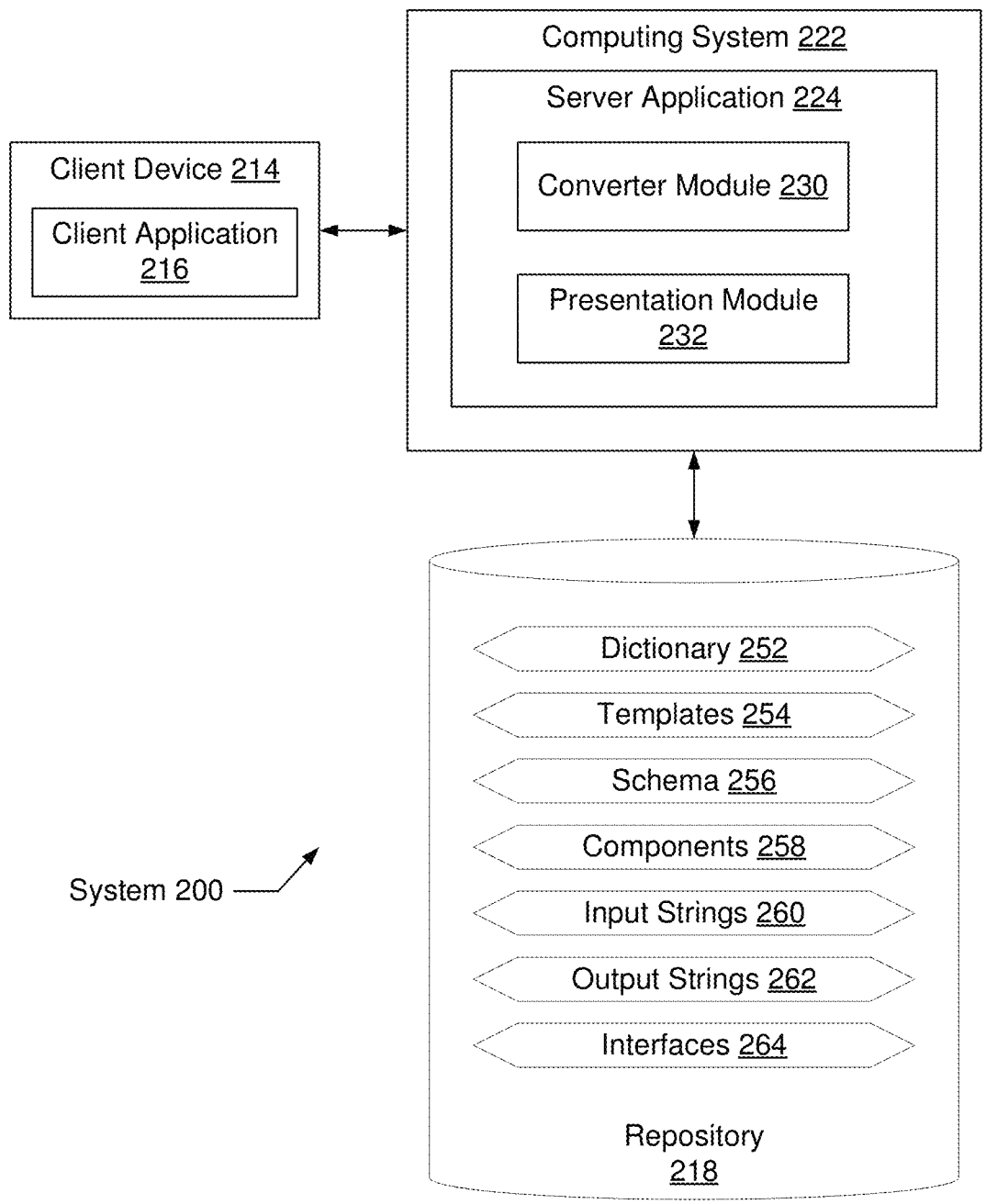
FIG. 2.2

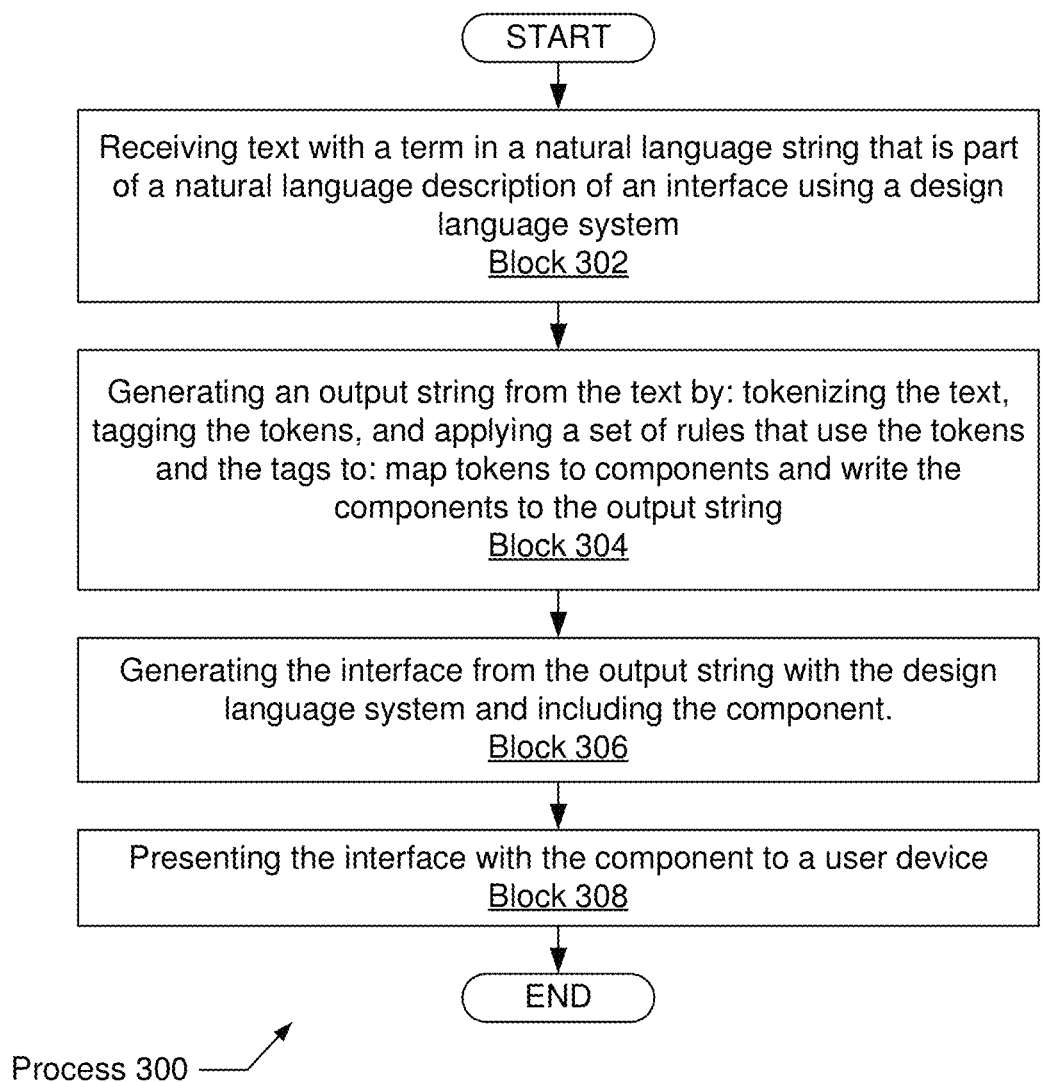
FIG. 3.1

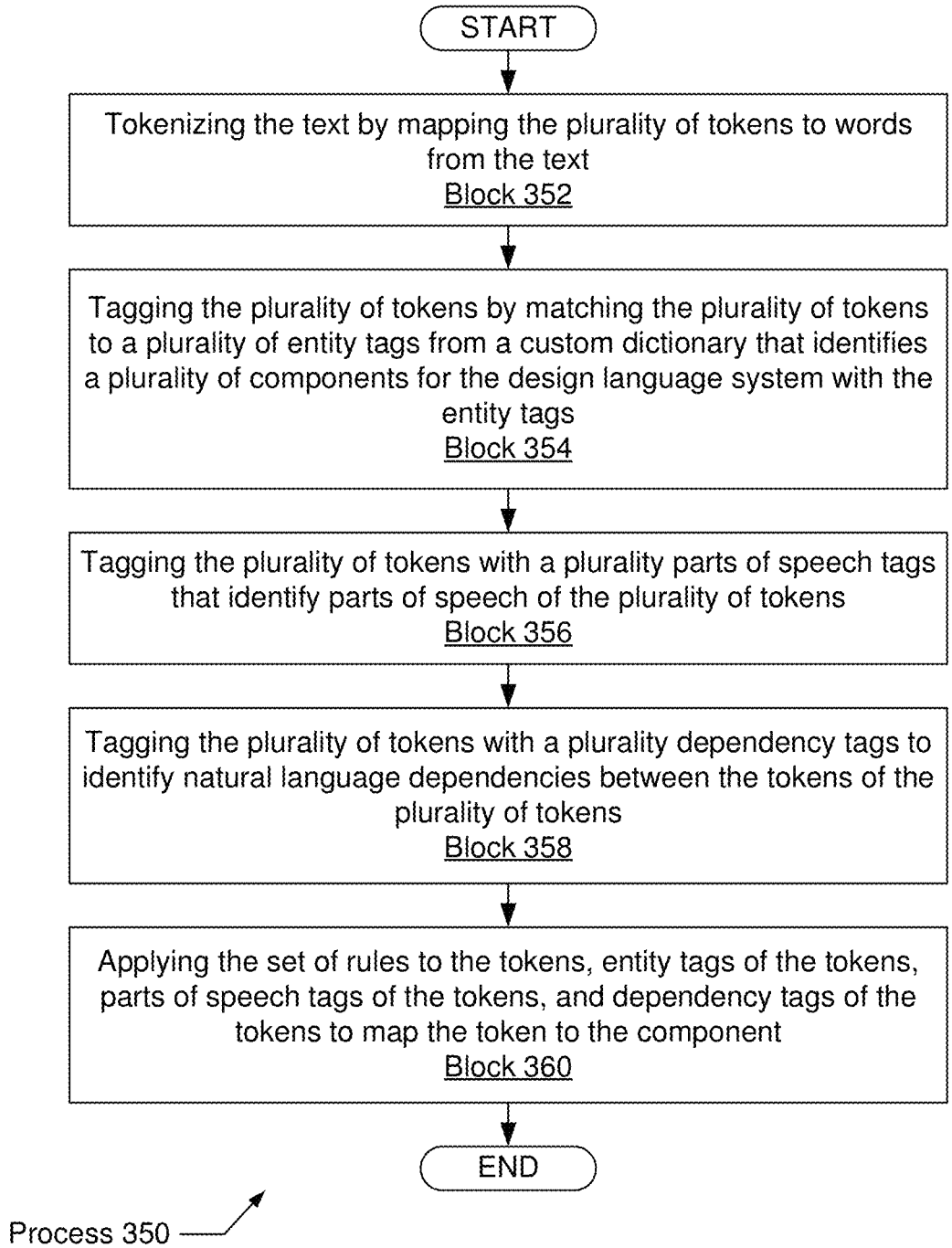
FIG. 3.2

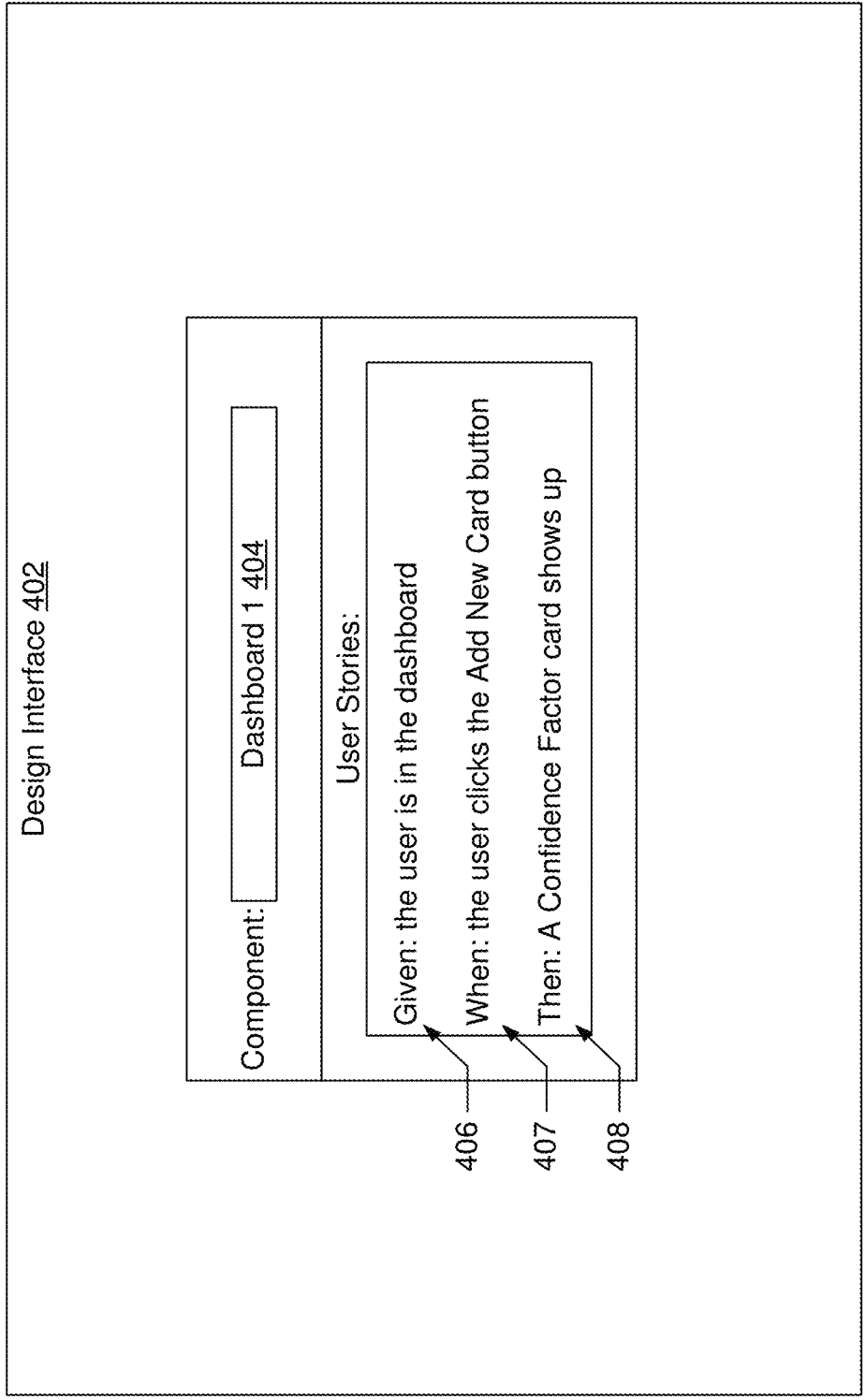
FIG. 4.1

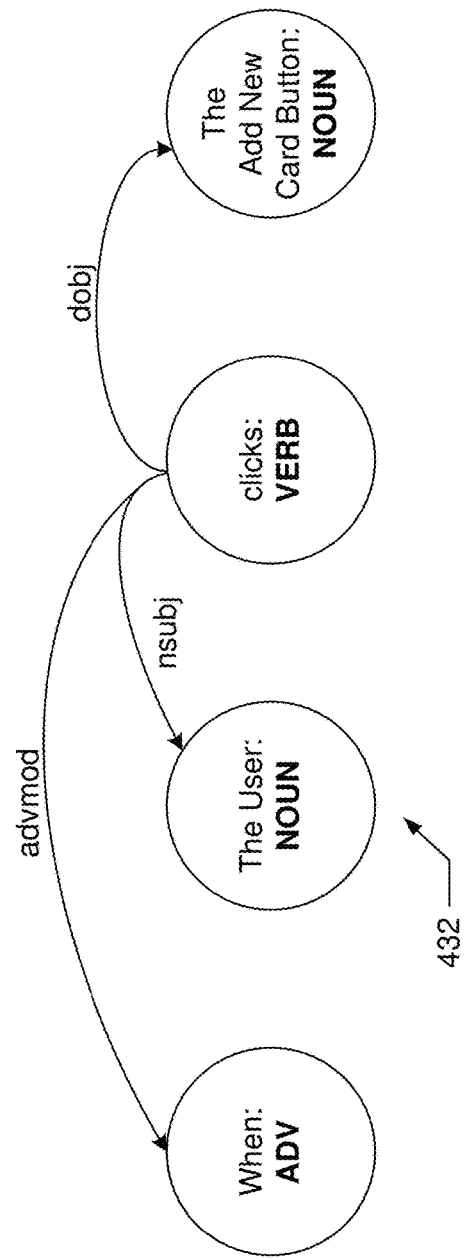
Input String 422
{
"text": "Given: the user is in the dashboard\nWhen: the user clicks the Add New Card button\nThen: A Confidence Factor card shows up",
"user_input": []
}
FIG. 4.2
FIG. 4.3

```
Output String 442

1  {
2    "json_response": {
3      "confirmation": [], # this would be populated if a DLS template wasn't identified in the user story
4      "processed": true, # true of it was able to generate a prototype json
5      "prototype_json": {
6        "components": { # components that belong to the template identified
7          "buttons": [{
8            "classnames": "primary",
9            "text": "add new card"
10         }],
11         "cards": [{
12           "subtitle": "Card Subtitle",
13           "title": "confidence factor"
14         }]
15       },
16       "content": { # attributes of the template
17         "title": "dashboard"
18       },
19       "context": "dashboard" # template
20     }
21   }
22 }
```

FIG. 4.4

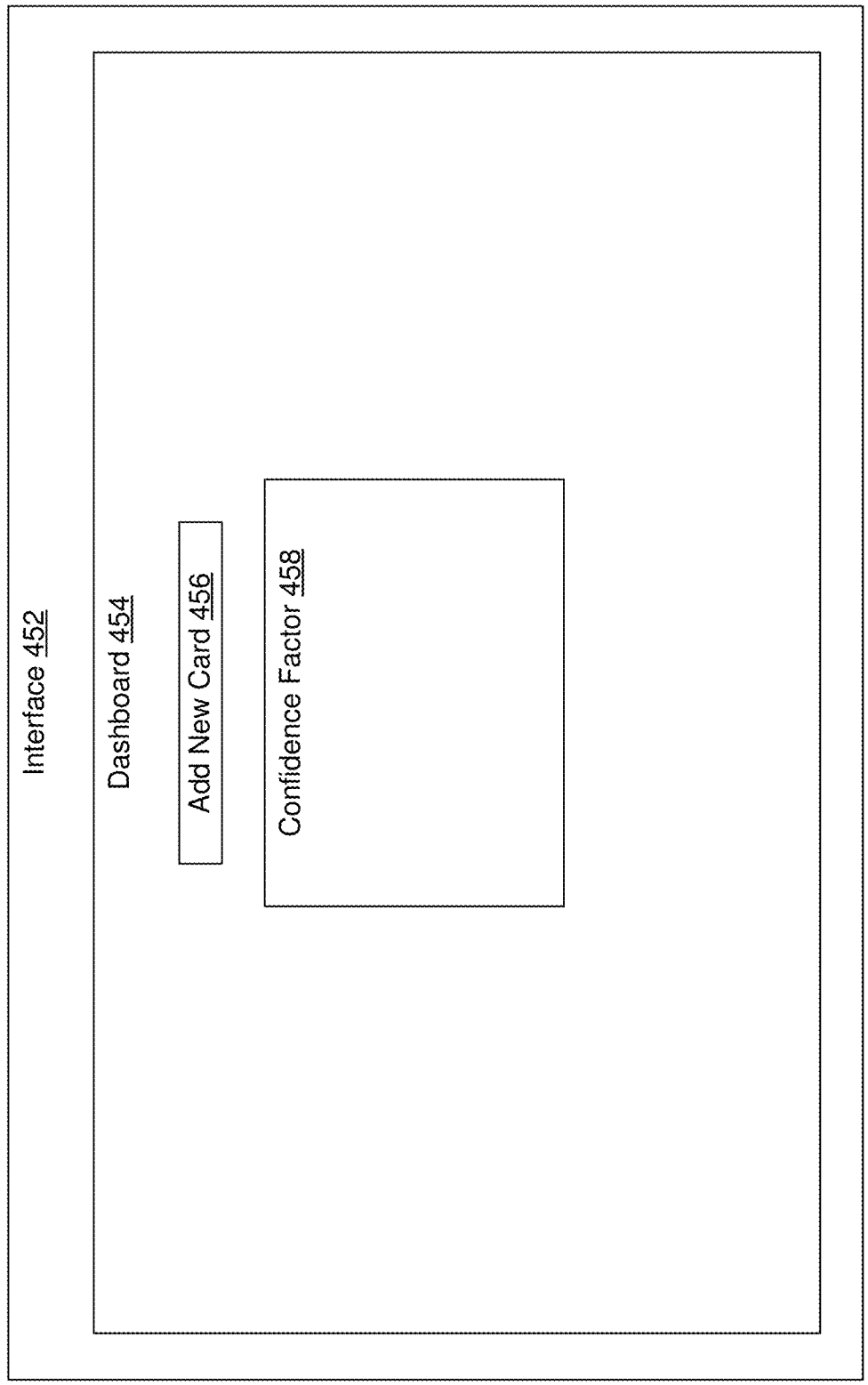
FIG. 4.5

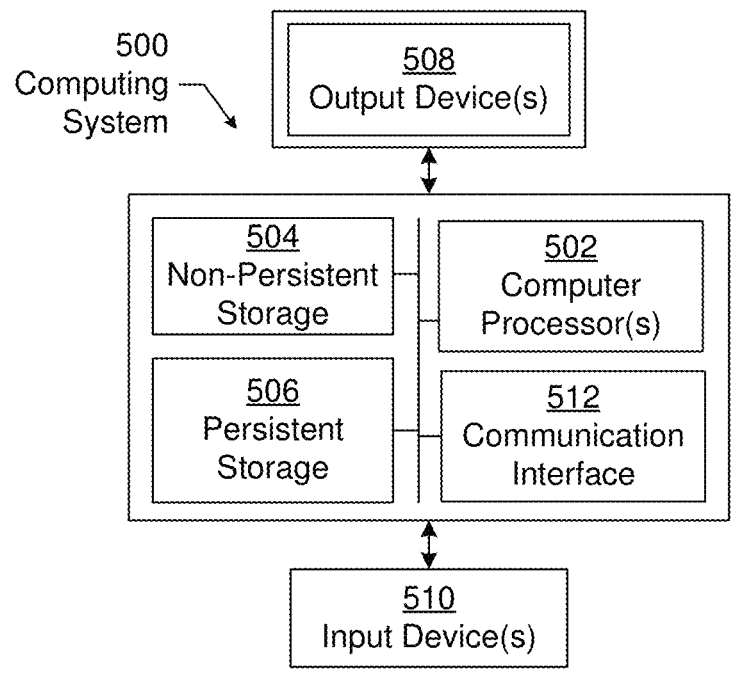
*FIG. 5.1*
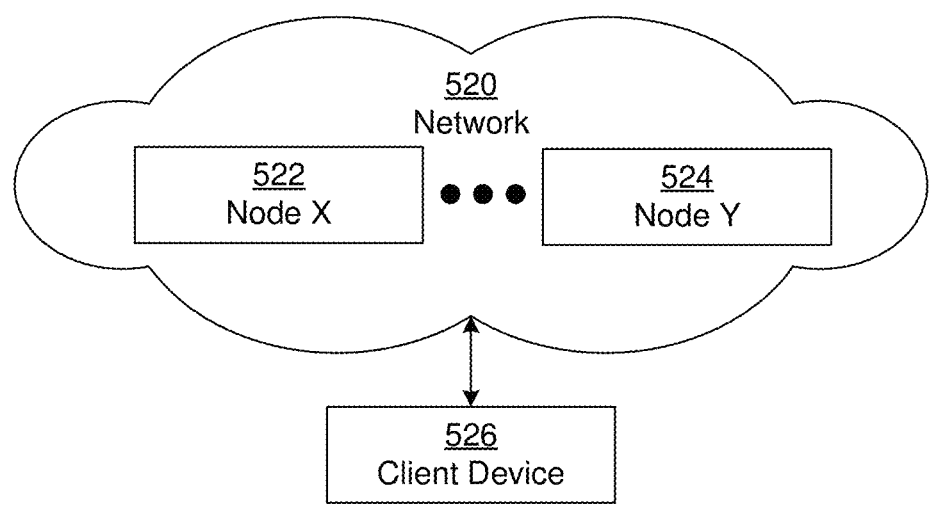
*FIG. 5.2*

CONVERTING TEXT-BASED REQUIREMENTS TO A LIVE PROTOTYPE

BACKGROUND

Design language systems improve digital product experience and project collaboration by using standard components with a similar look and feel. Production and design of websites and web applications, even with design language systems, is still a challenge when designing for domain-specific content with limited design resources.

SUMMARY

In general, in one or more aspects, the disclosure relates to a method that includes receiving text with a natural language string. The text includes a term for a component from a design language system and the natural language string describes at least a part of an interface. The method further includes generating, by a converter module, an output string from the text by: tokenizing the text to form a plurality of tokens that include a token for the term, tagging the token with a tag for the term, and applying a rule that uses the token and the tag. Applying the rule maps the token to the component of the design language system and writes the component into the output string. The method further includes generating the interface from the output string. The interface is made with the design language system and includes the component from the output string. The interface is presented with the component to a device.

Other aspects of the disclosure will be apparent from the following description and the appended claims.

BRIEF DESCRIPTION OF DRAWINGS

FIG. 2.1 and FIG. 2.2 show diagrams of a system in accordance with disclosed embodiments.

FIG. 3.1 and FIG. 3.2 show flowcharts in accordance with disclosed embodiments.

FIG. 4.1, FIG. 4.2, FIG. 4.3, FIG. 4.4, and FIG. 4.5 show examples in accordance with disclosed embodiments.

FIG. 5.1 and FIG. 5.2 show computing systems in accordance with disclosed embodiments.

DETAILED DESCRIPTION

Figure 1:
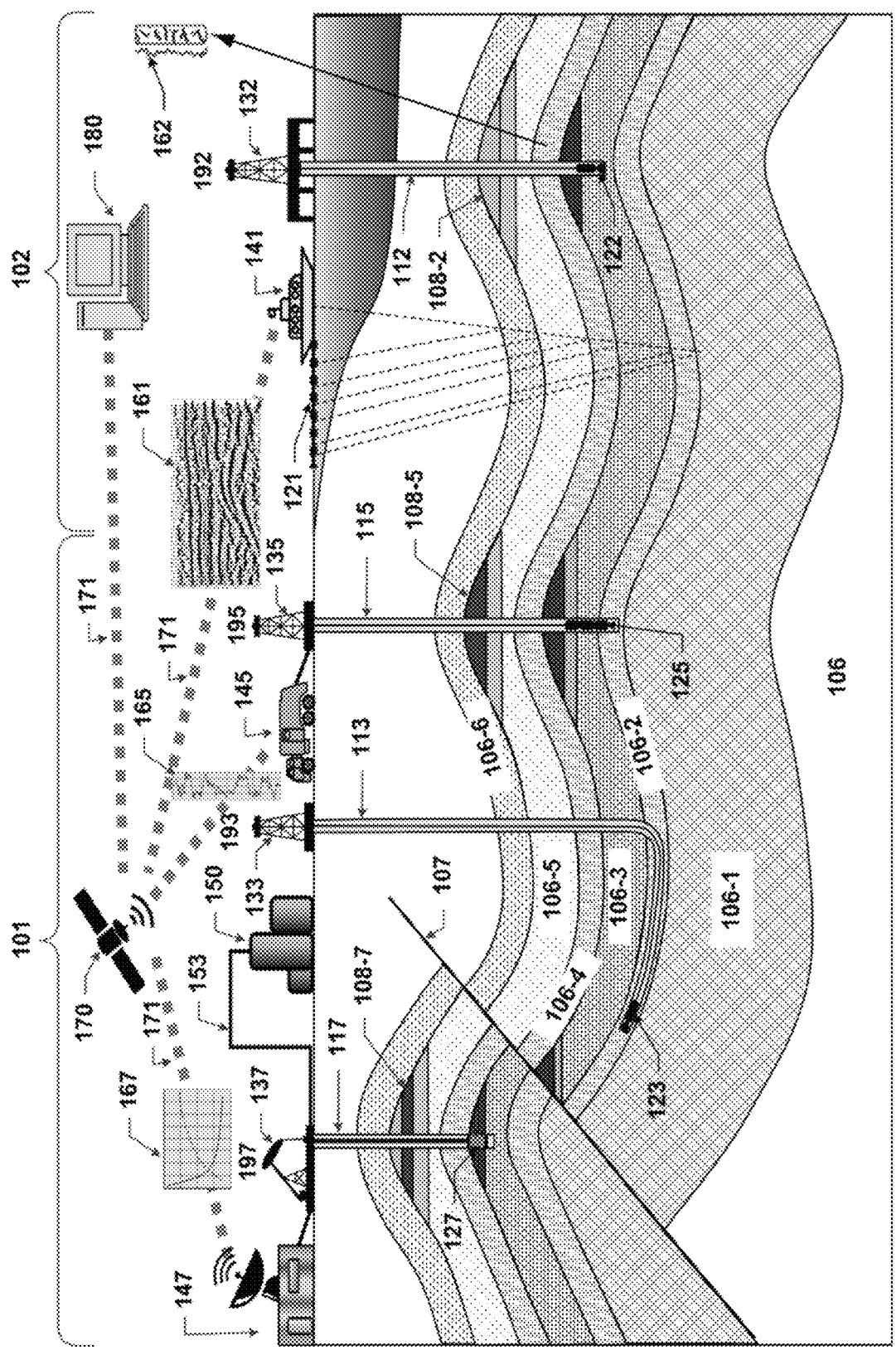
FIG. 1 shows a diagram of a system in accordance with disclosed embodiments.

Specific embodiments will now be described in detail with reference to the accompanying figures. Like elements in the various figures are denoted by like reference numerals for consistency.

In the following detailed description of embodiments of the technology, numerous specific details are set forth in order to provide a more thorough understanding. However, it will be apparent to one of ordinary skill in the art that various embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, a natural language processing (NLP) based design solution enables the creators of websites and web applications to convert inputs from natural language text to a live interface in accordance with a design language system with one click. The system converts requirements to an interface (e.g., application interface, prototype of an interface). The system has at least three parts: a design interface with a set of forms for formatting the requirements of the interface, a converter module that uses natural language processing and machine learning, and a presentation module to generate the interface. The modules work together to convert the requirements to a live interface.

A design language system is an overarching scheme or style that guides the design of a complement of products, including websites and web applications. The design language system may include software development documents that provide recommendations and components. The recommendations and components are used to make application interfaces more intuitive, learnable, and consistent by defining a common look and feel for applications in a particular environment (e.g., desktop, mobile, cloud, etc.).

Turning now to the Figures, the interface may be generated and defined for an oilfield environment. The acquisition of hydrocarbons is a complex data driven computationally expensive process. Each of the different aspects of the operations in the oilfield transfer information to various engineers, scientists, and other stakeholders. Because of the volume of information and the complexity, user interfaces for the oilfield applications are tasked with simplifying the complexity into parts that are human understandable. FIG. 1 depicts a schematic view, partially in cross section, of an onshore field (101) and an offshore field (102) for which one or more embodiments may be implemented. The embodiments of FIG. 1 may include the features and embodiments described in the other figures of the application. One or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). The rock formations may include at least one seal rock, for example, the shale layer (106-6), which may act as a top seal. The rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

Data acquisition tools (121), (123), (125), and (127), may be positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). A wellsite system may be connected to a production equipment. For example, the well system (197) is connected to the surface storage tank (150) through the fluids transport pipeline (153).

The surface units (141), (145), and (147), may be operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. The surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

The surface units (141), (145), and (147) may be communicatively coupled to the E&P computer system (180) via the communication links (171). The communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. The E&P computer system (180) may be provided with functionality for manipulating and analyzing the data, such as analyzing seismic data to determine locations of hydrocarbons in the geologic sedimentary basin (106) or performing simulation, planning, and optimization of E&P operations of the wellsite system. The results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 5.1 and 5.2 and described below.

FIG. 2.1 and FIG. 2.2 show diagrams of embodiments that are in accordance with the disclosure. FIG. 2.1 shows the server application (224) that converts natural language inputs to output strings and interfaces. FIG. 2.2 shows the system (100), which performs the conversion of text-based requirements to a live prototype. The embodiments of FIG. 2.1 and FIG. 2.2 may be combined and may include or be included within the features and embodiments described in the other figures of the application. The features and elements of FIG. 2.1 and FIG. 2.2 are, individually and as a combination, improvements to the technology of computing technology. The various elements, systems, and components shown in FIG. 2.1 and FIG. 2.2 may be omitted, repeated, combined, and/or altered as shown from FIG. 2.1 and FIG. 2.2. Accordingly, the scope of the present disclosure should not be considered limited to the specific arrangements shown in FIG. 2.1 or FIG. 2.2.

Turning to FIG. 2.1, the server application (224) is a set of programs that execute on the computing system (222) of FIG. 2.2. The server application (224) receives natural language strings (e.g., natural language string (261)), generates output strings (e.g., output string (263)) from the natural language strings, and generates interfaces (e.g., interface (265)) from the output strings. The server application (224) may form a Software-as-a-Service (SaaS) platform and utilize container based deployment, event-driven protocols, non-blocking input output (I/O) models, SQL (structured query language), NoSQL (no structured query language) data modelling, representational state transfer application programming interface (RESTful API) design, etc. The programs that form the server application (224) may be deployed in local containers on the computing system (222) of FIG. 2.2. The server application (224) includes the converter module (230) and the presentation module (232).

The converter module (230) is a set of programs that execute on the computing system (222). The converter module (230) uses the dictionary (252), the templates (254), and the schema (256) to generate the output string (263) from the natural language string (261). Multiple natural language strings may be used to generate the output string (263).

The natural language string (261) is one of the input strings (260) from FIG. 2.2. The natural language string (261) is text written in natural human language and includes a term that identifies a component from the components (258). The natural language string (261) may be part of an input string that is formatted according to a data interchange format. The data interchange format uses human-readable text to transmit data objects with attribute value pairs and array data types. The data interchange format may be the JavaScript object notation standard (JSON).

The output string (263) is one of the output strings (262) from FIG. 2.2. The output string (263) is human-readable text that specifies the components (258) that are included in the interface (265).

The presentation module (232) is a set of programs that execute on the computing system (222). The presentation module (232) presents the components (258) specified in the output string (263) to the client device (214) of FIG. 2.2 by generating the interface (265) from the output string (263) using the schema (256). The interface may be a page of a website that is rendered by the client application (216) of FIG. 2.2 on the client device (214) of FIG. 2.2.

Turning to FIG. 2.2, the system (200) includes the computing system (222) that converts of text-based requirements to the interface. The interface may be a prototype of an interface. The computing system (222) includes the server application (224) described in FIG. 2.1.

The client device (214) of the system (200) is an embodiment of the computing system (500) and the nodes (522) and (524) of FIG. 5.1 and FIG. 5.2. The client device (214) includes the client application (216) for accessing the server application (224). The client application (216) may include a graphical user interface for interacting with the server application (224). A user may operate the client application (216) to generate and view the interfaces (264).

The client application (216) may be a web browser that accesses the server application (224) using web pages hosted by the computing system (222). Additionally, the client application (216) may be a web service that communicates with the server application (224) using a representational state transfer application programming interface (RESTful API). Although a client server architecture is shown, one or more parts of the server application (224) may be a local application on the client device without departing from the claimed scope.

The repository (218) is a computing system that may include multiple computing devices in accordance with the computing system (500) and the nodes (522) and (524) described below in FIGS. 5.1 and 5.2. The repository (218) may be hosted by a cloud service provider for an E&P services provider. The cloud service provider may provide hosting, virtualization, and data storage services as well as other cloud services and the E&P services provider may operate and control the data, programs, and applications of the system (200). The data in the repository (218) may include the dictionary (252), the templates (254), the schema (256), the components (258), the input strings (260), the output strings (262), and the interfaces (264). The data in the repository (218) may be processed by programs executing on the computing system (222) as described below. The repository (218) may be hosted by the same cloud services provider as the computing system (222). The dictionary (252), the templates (254), the schema (256), the components (258), the input strings (260), the output strings (262), and the interfaces (264) may be stored in multiple computer data files by the repository (218).

The dictionary (252) identifies relationships between natural language words to the components (258) of a design language system. The dictionary (252) may be used to map words from the natural language text of the input strings (260) to the components (258) by the converter module (230). Each word in the dictionary is mapped to a component by the converter module (230). As an example, the word "button" may be mapped to a button component by the converter module (230) using the dictionary (252).

The templates (254) are component templates from the design language system that may include other components from the design language system. The templates (254) identify a hierarchy between the components (258) that may be written to the output strings (262). An example is provided in the code below:

DLS_template=['dashboard', 'project detail', 'project overview', 'components', 'editor card', 'editor modal', 'task editor', 'selector field']

DLS_component=['bar gauge', 'button', 'card', 'carousel', 'dashboard', 'data table', 'dropdown', 'expandable panel', 'facet text', 'geographic map', 'histogram', 'icon', 'loading spinner', 'logview', 'modal', 'navigation', 'nested list', 'panel list', 'pie chart', 'progress indicator', 'project detail', 'project overview', 'radial gauge', 'search', 'selector field', 'slider', 'sparkline', 'stepper', 'tab control', 'tab control', 'text input', 'tooltip', 'user identity']

Allowed_components_per_template={
"dashboard": ["button", "card", "data table", "icon", "modal", "navigation", "search", "tab control", "tooltip", "user identity"],
"project detail": ["navigation", "card", "search", "tab control", "slider", "dropdown", "text input", "icon", "user identity"],
"project overview": ["navigation", "card", "bar gauge", "histogram", "sparkline", "search", "icon", "user identity"],
"selector field": ["facet text"]}

From the code above, the "DLS_template" data structure identifies components from the design language system that are component templates, the "DLS_component" data structure identifies the components available in the design language system, and the "Allowed_components_per_template" data structure identifies the components (258) that may be included in certain templates (254). For example, the "dashboard" component is a component template that may include button, card, data table, etc., components.

The schema (256) defines the syntax of the output strings (262) to specify the components (258) used in the interfaces (264). The schema (256) is used to format the output strings (262) from the converter module (230) into information that can be parsed and used by the presentation module (232).

The components (258) are the software components of the interfaces (264), which include user interface elements. The components (258) may include several types of components, including components for dialogs and popups, icons, inputs and controls, layout, templates, and visualizations.

The dialogs and popups components are a set of child windows of the parent application that is used to command user awareness and display emergency states. The dialogs and popups components may include modal, notification, popover, toast, and tooltip components.

The icons components are a set of visual representations of an item or tool that corresponds to an action. The icons components act as visual cues to educate and direct the user through the application experience. The icons components may include icon and user identity components.

The inputs and controls components are a set of form fields that receive entry of alphanumeric values as either single or multi-line entries. The inputs and controls components may include one or more buttons, check boxes, color pickers, confidence ratings, date pickers, dropdown, facet text areas, numeric input controls, radio button groups, search fields, sliders, tags, text input, time pickers, and toggle switch components.

The layout components are a set of containers that display content composed of other components and data. The layout components may include card, carousel, data table, expandable panel, navigation, nested list, pagination control, panel list, stepper, and tab control components.

The templates components provide interfaces where multiple areas of focus (jobs, projects, tasks, etc.) can be monitored simultaneously. The templates components may include dashboard, feedback, launch screen, login, notification hub, project detail, and project overview components.

The visualizations components are a set of interactive visualizations that convert data into graphics for the analytic purposes. The visualizations components may include bar gauge, geographic map, histogram, loading spinner, log view, pie chart, progress indicator, radial gauge, and sparkline components.

The input strings (260) are text strings written in natural language (e.g., English). The input strings (260) define the interfaces (264) in using sentences or phrases. As such, the input strings may include a subject, verb, direct and/or indirect objects, prepositional phrases, etc. The input strings (260) are user stories that describe the actions and controls a user may take and use when interacting with the interfaces (264). An input string may include multiple user stories and may be formatted according to a human-readable data interchange format (e.g., JavaScript object notation standard (JSON)).

The output strings (262) are text strings with a syntax defined by the schema (256). The output strings (262) specify the components (258) that are used in the interfaces (264) and are formatted according to a human-readable data interchange format (e.g., JavaScript object notation standard (JSON)).

The interfaces (264) are the user interfaces generated by the system (100) from the input strings (260). The interfaces (264) may be stored as renderable files. For example, the interfaces (264) may include hypertext markup language (HTML) files that include the components (258) written in the output strings (262) and specified in the input strings (260).

FIG. 3.1 and FIG. 3.2 show flowcharts of the processes (300) and (350) in accordance with the disclosure. The process (300) converts text-based requirements to a live prototype by generating an interface from an output string generated from a natural language input string. The process (350) describes processes used to generate the output string from the input string. The embodiments of FIG. 3.1 and FIG. 3.2 may be combined and may include or be included within the features and embodiments described in the other figures of the application. The features of FIG. 3.1 and FIG. 3.2 are, individually and as an ordered combination, improvements to the technology of computing systems. While the various blocks in the flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven. By way of an example, determination blocks may not have a processor process an instruction unless an interrupt is received to signify that condition exists. As another example, determinations may be performed by performing a test, such as checking a data value to test whether the value is consistent with the tested condition.

Turning to FIG. 3.1, the process (300) generates an interface from an output string generated from a natural language input string. In Block 302, text with a natural language string including a term for a component from a design language system is received. The natural language string is part of a natural language description of an interface that uses the design language system. The text may be received from a client device displaying a design interface as part of an interactive website for designing prototype interfaces.

In Block 304, an output string is generated from the text by tokenizing the text, tagging the tokens, and applying rules. The text is tokenized to form tokens that correspond to the terms (i.e., the words or phrases) within the text. Each token may be an integer that uniquely identifies a particular term in the text. Tokenization is further described below in relation to Block 352 of FIG. 3.2.

The tokens are tagged with multiple tags. Each token may be tagged with at least one tag corresponding to the terms in the token. The tags may include entity tags, parts of speech tags, and dependency tags, which are further described below in relation to Blocks 354, 356, and 358 of FIG. 3.2.

Rules are applied to the tokens and tags. The application of the rules maps the tokens to components of the design language system. Application of the rules also writes the components to the output strings that define the interface. Applying the rules is further described in relation to Block 360 of FIG. 3.2.

In Block 306, the interface is generated from the output string. The interface is made with the design language system and includes the component written in the output string.

In Block 308, interfaces are presented with the components from the input natural language strings to a user device. An interface is presented in response to a request, the request including a uniform resource locator (URL) that identifies the interface. The interface includes the components identified in the user stories provided by a user with the design interface.

Turning to FIG. 3.2, the process (350) further describes Block 304 of FIG. 3.1. In Block 352, the text is tokenized by mapping tokens to words from the text. The set of words recognized by the system forms a vocabulary. Each distinct word is associated with a unique token that identifies the word.

In Block 354, the tokens are tagged by matching the tokens to entity tags from a custom dictionary. The custom dictionary identifies the components from the design language system with the entity tags. For example, the token for the word "button" may be tagged with a "button" tag, which identifies the button component from the design language system.

In Block 356, the tokens are tagged with parts of speech tags. The parts of speech tags identify the parts of speech of the tokens (e.g., noun, verb, adjective, etc.). The parts of speech tagging and processing may be performed by a natural language processing engine that uses machine learning with neural networks that identifies the parts of speech of the words of the text using the word tokens and parts of speech tags.

In Block 358, the tokens are tagged with dependency tags. The dependency tags identify natural language dependencies between the tokens mapped to the words from the natural language input string. The dependency tags may identify the subjects and objects within a sentence. The natural language processing engine that performs the parts of speech tagging may also perform the dependency tagging.

In Block 360, rules are applied to the tokens and tags (including the entity tags, the parts of speech tags, and the dependency tags) to map the tokens to the components from the design language system. For example, a rule may have that a token for the word "button", from the phrase "add new card button", is tagged as a button component with an entity tag, tagged as a noun with a parts of speech tag, and tagged as a direct object with a dependency tag be written to the output string inside of a components object (see an example in FIG. 4.4). Further, an additional rule may identify the adjectives ("add new card") in front of the noun ("button") are the text to be displayed on the button in the interface and also be identified as such in the output string.

FIG. 4.1, FIG. 4.2, FIG. 4.3, FIG. 4.4, and FIG. 4.5 show examples of systems and interfaces in accordance with the disclosure. FIG. 4.1 shows a design interface for receiving natural language input strings as user stories. FIG. 4.2 shows the input string received from the design interface. FIG. 4.3 shows an example of a natural language parse tree from a tagged input string. FIG. 4.4 shows an example of an output string generated from an input string. FIG. 4.5 shows the presentation of an interface generated from the output string. The embodiments of FIG. 4.1, FIG. 4.2, FIG. 4.3, FIG. 4.4, and FIG. 4.5 may be combined and may include or be included within the features and embodiments described in the other figures of the application. The features and elements of FIG. 4.1, FIG. 4.2, FIG. 4.3, FIG. 4.4, and FIG. 4.5 are, individually and as a combination, improvements to the technology of computing systems and machine learning systems. The various features, elements, widgets, components, and interfaces shown in FIG. 4.1, FIG. 4.2, FIG. 4.3, FIG. 4.4, and FIG. 4.5 may be omitted, repeated, combined, and/or altered as shown. Accordingly, the scope of the present disclosure should not be considered limited to the specific arrangements shown in FIG. 4.1, FIG. 4.2, FIG. 4.3, FIG. 4.4, and FIG. 4.5.

Turning to FIG. 4.1, the design interface (402) is a form used to specify the requirements for a prototype interface. The design interface (402) allows the user to write up a description and acceptance criteria in a format of "Given . . . When . . . Then . . . And . . . " in order to intelligently detect the words to be used in composing the interface. In the design interface (402), the user has indicated that the dashboard component (404) includes the user stories written in the natural language text strings (406), (407), and (408).

An efficient fuzzy keyword matching technique is used to recognize design language system entities (e.g., components and templates) in each sentence. When no match exists, word similarity metrics are used to suggest closest known entities to the words from the natural language text and an option is presented to the user to select one of the closest known entities.

Turning to FIG. 4.2, the input string (422) is generated from the user stories of the natural language text strings (406), (407), and (408). User stories follow a particular format, where each sentence starts with one of the following words: "Given"; "When"; "Then"; and "And". These markers are recognized first and the stories are split into separate sentences relating to the context and action.

Turning to FIG. 4.3, a dependency parse tree of a sentence in the user story may be displayed. Natural language processing is used to understand user stories from the input string, which define product features from a user's perspective. The dependency tree is constructed to identify subjects (nsubj), positional objects, adverbs (advmod) and direct objects (dobj).

Turning to FIG. 4.4, the output string (442) is generated from the input string (422) of FIG. 4.2. A rule-based algorithm is employed to generate a JSON (JavaScript Object Notation) file containing the output string (442) and detailing the design language system, templates, components, and the associated attribute values required to build the prototype user interface. The output string (442) is shown with comments (text on a line after a "#") and the comments may be removed before generating the interface from the output string (442).

Turning to FIG. 4.5, a design language system based interface (452), which was converted from a set of text-based requirements is presented. The interface (452) may be embedded in the web application running on the client device that is used to design the prototype interface (452). The interface (452) may also be live and accessible by other devices with a uniform resource locator (URL).

Other features and suggestions may be provided for additional components (e.g., components for "create new", "requirement list", "planning", "relationship and discussion"). The user can create a new requirement with the suggested components or a user story with natural language text strings and check the relationship of the requirements by adding the suggested components to the interface (452) using the design interface (402) from FIG. 4.1.

The generated interface (452) is rendered at a separated micro service, which may also be referred to as a template web service. The template web service used to render the interface (452) has predefined design language system templates. The template web service is mounted at a particular route (URL path) that may be used to access the interface (452).

The interface (452) is rendered in following: the template web service is requested by the prototype site with parameters in the uniform resource locator; the service connects to a database to query (i.e., search) for the output string (also referred to as a JSON result) with the given parameters from the uniform resource locator; the JSON result (the output string) is generated by the backend from the input string in response to an initial query (subsequent queries may use a cached response); and components are composed according to the database response. The content in the interface (452) is dynamic and configured by the JSON output string (442).

The interface (452) includes the dashboard (454). The dashboard (454) includes the "Add New Card" button (456) and the "Confidence Factor" card object (458), which may be displayed in response to selecting the button (456).

Embodiments disclosed herein may be implemented on a computing system. Any combination of mobile, desktop, server, router, switch, embedded device, or other types of hardware may be used. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (500) in FIG. 5.1 may be connected to or be a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the technology.

The computing system or group of computing systems described in FIG. 5.1 and FIG. 5.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready.

An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the technology. The processes may be part of the same or different application and may execute on the same or different computing system.

Rather than or in addition to sharing data between processes, the computing system performing one or more embodiments of the technology may include functionality to receive data from a user. For example, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the technology, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 5.1 and the nodes and/or client device in FIG. 5.2. Other functions may be performed using one or more embodiments of the technology.

While the technology has been described with respect to a limited number of embodiments, those skilled in the art, having benefit of this disclosure, will appreciate that other embodiments can be devised which do not depart from the scope as disclosed herein. Accordingly, the scope of the technology should be limited only by the attached claims.

What is claimed is:

1. A method comprising:
   receiving text with a natural language string, the text including a term for a component from a design language system, wherein the natural language string describes at least a part of an interface;
   generating, by a converter module, an output string from the text by:
      tokenizing the text to form a plurality of tokens, the plurality of tokens comprising a token for the term,
      tagging the token with a tag for the term, and
      applying a rule, of a set of rules, that uses the token and the tag to:
         map the token to the component of the design language system, and
         write the component in the output string;
   generating the interface from the output string, the interface made with the design language system, the interface including the component in the output string; and
   presenting the interface with the component to a device.

2. The method of claim 1, further comprising:
   tokenizing the text by mapping the plurality of tokens to words from the text.

3. The method of claim 1, further comprising:
   tagging the plurality of tokens by matching the plurality of tokens to a plurality of entity tags from a custom dictionary that identifies a plurality of components for the design language system with the entity tags.

4. The method of claim 1, further comprising:
   tagging, with the converter module, the plurality of tokens with a plurality parts of speech tags that identify parts of speech of the plurality of tokens.

5. The method of claim 1, further comprising:
   tagging, with the converter module, the plurality of tokens with a plurality of dependency tags to identify natural language dependencies between the tokens of the plurality of tokens.

6. The method of claim 1, further comprising:
   applying the set of rules to the plurality of tokens, a plurality of entity tags of the text tokens, a plurality of parts of speech tags of the text tokens, and a plurality of dependency tags of the text tokens to map the token to the component.

7. The method of claim 1, further comprising:
   identifying the component for the term by applying a fuzzy string matching algorithm to the term to identify a set of components from the design language system.

8. The method of claim 1, further comprising:
   applying the rule to the token and the tag, wherein the tag is a dependency tag that identifies the token as an object of a prepositional phrase.

9. The method of claim 1, further comprising:
   applying the rule to the token and the tag, wherein the tag is a parts of speech tag that identifies the token as a noun.

10. The method of claim 1, further comprising:
    presenting a design interface that includes a field into which the text is entered; and
    presenting the interface in response to receiving the text.

11. The method of claim 1, further comprising:
generating the interface as a website with a uniform resource locator that includes a query identifying the interface.

12. The method of claim 1, further comprising:
receiving the text as an input string formatted according to a data interchange format that uses human-readable text to transmit data objects with attribute-value pairs and array data types.

13. The method of claim 1, further comprising:
generating the output string formatted according to a data interchange format that uses human-readable text to transmit data objects with attribute-value pairs and array data types.

14. The method of claim 1, wherein the text and the output string are formatted according to the JavaScript object notation (JSON) standard.

15. A system comprising:
a memory coupled to a processor;
an application that executes on the processor, uses the memory, and is configured for:
receiving text with a natural language string including a term for a component from a design language system, wherein the natural language string is part of a natural language description of an interface that uses the design language system;
generating, by a converter module, an output string from the text by:
tokenizing the text to form a plurality of tokens, the plurality of tokens comprising a token for the term,
tagging the token with a tag for the term, and
applying a rule, of a set of rules, that uses the token and the tag to:
map the token to the component of the design language system, and
write the component in the output string;
generating the interface from the output string, the interface made with the design language system, the interface including the component in the output string; and
presenting the interface with the component to a user device.

16. The system of claim 11, wherein the application is further configured for:
tokenizing the text by mapping the plurality of tokens to words from the text.

17. The system of claim 11, wherein the application is further configured for:
tagging the plurality of tokens by matching the plurality of tokens to a plurality of entity tags from a custom dictionary that identifies a plurality of components for the design language system with the entity tags.

18. The system of claim 11, wherein the application is further configured for:
tagging, with the converter module, the plurality of tokens with a plurality parts of speech tags that identify parts of speech of the plurality of tokens.

19. The system of claim 11, wherein the application is further configured for:
tagging, with the converter module, the plurality of tokens with a plurality of dependency tags to identify natural language dependencies between the tokens of the plurality of tokens.

20. A non-transitory computer readable medium comprising computer readable program code for:
receiving text with a natural language string including a term for a component from a design language system, wherein the natural language string is part of a natural language description of an interface that uses the design language system;
generating, by a converter module, an output string from the text by:
tokenizing the text to form a plurality of tokens, the plurality of tokens comprising a token for the term,
tagging the token with a tag for the term, and
applying a rule, of a set of rules, that uses the token and the tag to:
map the token to the component of the design language system, and
write the component in the output string;
generating the interface from the output string, the interface made with the design language system, the interface including the component in the output string; and
presenting the interface with the component to a user device.

* * * * *